United States Patent
Watanabe et al.

(10) Patent No.: US 9,579,993 B2
(45) Date of Patent: Feb. 28, 2017

(54) SEAT DEVICE

(71) Applicant: TS TECH CO., LTD., Asaka-shi, Saitama (JP)

(72) Inventors: Masato Watanabe, Shioya-gun (JP); Tsukasa Meguro, Shioya-gun (JP)

(73) Assignee: TS TECH CO., LTD., Asaka-shi (JP)

( * ) Notice: Subject to any disclaimer, the term of this patent is extended or adjusted under 35 U.S.C. 154(b) by 78 days.

(21) Appl. No.: 14/758,342

(22) PCT Filed: Dec. 26, 2013

(86) PCT No.: PCT/JP2013/084939
§ 371 (c)(1),
(2) Date: Jun. 29, 2015

(87) PCT Pub. No.: WO2014/104211
PCT Pub. Date: Jul. 3, 2014

(65) Prior Publication Data
US 2015/0367753 A1    Dec. 24, 2015

(30) Foreign Application Priority Data
Dec. 27, 2012  (JP) ................................. 2012-283912

(51) Int. Cl.
*B60N 2/005*  (2006.01)
*B60N 2/07*   (2006.01)
(Continued)

(52) U.S. Cl.
CPC ............. *B60N 2/073* (2013.01); *B60N 2/015* (2013.01); *B60N 2/067* (2013.01); *B60N 2/075* (2013.01)

(58) Field of Classification Search
CPC ........ B60N 2/073; B60N 2/067; B60N 2/015; B60N 2/075
(Continued)

(56) References Cited

U.S. PATENT DOCUMENTS

| 5,125,611 A | * | 6/1992 | Cox ..................... B60N 2/0232 248/420 |
| 5,242,143 A | * | 9/1993 | Nagashima .......... B60N 2/0705 248/188.9 |

(Continued)

FOREIGN PATENT DOCUMENTS

| JP | H07-205700 A | 8/1995 |
| JP | 2012-076546 A | 4/2012 |

OTHER PUBLICATIONS

Mar. 18, 2014 International Search Report issued in Application No. PCT/JP2013/084939.

*Primary Examiner* — Bradley Duckworth
(74) *Attorney, Agent, or Firm* — Oliff PLC

(57) ABSTRACT

A seat device includes left and right slide units for supporting a seat body slidably in a front-rear direction; left and right front support legs respectively fixed to front ends of the left and right slide units; left and right rear support legs respectively fixed to rear ends of the left and right slide units; and a reinforcing member extending between the front and rear support legs fixed to one of the left and right slide units. The reinforcing member includes a first wall attached to one side of the front support leg and the one side of the rear support leg; second wall attached to the other side of the front support leg and the other side of the rear support leg, the second wall facing the first wall; and a first connecting portion connecting lower ends of the first and second walls with each other.

20 Claims, 7 Drawing Sheets

(51) Int. Cl.
*B60N 2/015* (2006.01)
*B60N 2/06* (2006.01)
*B60N 2/075* (2006.01)

(58) Field of Classification Search
USPC .......................................................... 248/429
See application file for complete search history.

(56) References Cited

U.S. PATENT DOCUMENTS

| | | | | |
|---|---|---|---|---|
| 6,105,920 | A * | 8/2000 | Gauger | B60N 2/0232 248/429 |
| 6,299,121 | B1 * | 10/2001 | Brault | B60N 2/01508 248/429 |
| 6,352,312 | B1 * | 3/2002 | Rees | B60N 2/071 248/429 |
| 7,137,665 | B2 * | 11/2006 | Osawa | B60N 2/071 177/136 |
| 7,309,107 | B2 * | 12/2007 | Smith | B60N 2/0705 248/429 |
| 8,245,994 | B2 * | 8/2012 | Yamada | B60N 2/073 248/424 |
| 8,998,324 | B2 * | 4/2015 | Kitaguchi | B60N 2/06 248/429 |
| 2006/0255582 | A1 * | 11/2006 | Kawasaki | B60N 2/073 280/801.1 |
| 2012/0181408 | A1 * | 7/2012 | Matsushima | B60N 2/0705 248/429 |
| 2013/0264454 | A1 * | 10/2013 | Hayashi | B60N 2/0705 248/429 |
| 2014/0070067 | A1 * | 3/2014 | Jonsson | B60N 2/015 248/429 |
| 2015/0069202 | A1 * | 3/2015 | Hayashi | B60N 2/08 248/429 |
| 2015/0129737 | A1 * | 5/2015 | Oya | B60N 2/0722 248/429 |

* cited by examiner

SEAT DEVICE

TECHNICAL FIELD

The present invention relates to a seat device, specifically to a seat device to be mounted in a vehicle.

BACKGROUND ART a conventional seat device, for example, for a vehicle which includes support legs (front leg 71 and rear leg 72) respectively provided at front and rear ends of a slide rail for sliding a seat body (refer to Patent Document 1, for example) is known. Reinforcing members (side plates 73 and 74) made from plates are provided between the front and rear support legs to connect the front and rear support legs with each other. A bead (riser reinforcing portion 73a) extending in a front-rear direction is provided on the reinforcing member to enhance the reinforcing member itself.

PRIOR ART DOCUMENT

Patent Document

Patent Document 1: Japan Patent Laid-Open Publication No. 2012-76546

SUMMARY OF INVENTION

Problem to be Solved by the Invention

It has always been an object to increase the strength of each part of a seat device and, in particular, it has been strongly demanded to increase the strength of each support leg for supporting a seat body.

The object of the present invention is to strengthen a connection between front and rear support legs to enhance the strength of the support legs.

Means for Solving the Problem

To solve the above problem, the invention according to claim 1 is a seat device, comprising: left and right slide units for supporting a seat body slidably in a front-rear direction; left and right front support legs respectively fixed to front ends of the left and right slide units; left and right rear support legs respectively fixed to rear ends of the left and right slide units; and a reinforcing member extending between the front and rear support legs fixed to one of the left and right slide units, wherein the reinforcing member includes: a first wall attached to one side of each of the front and rear support legs; a second wall attached to the other side of each of the front and rear support legs, the second wall facing the first wall; and a first connecting portion connecting lower parts of the first and second walls with each other.

The invention according to claim 2 is the seat device according to claim 1, wherein the reinforcing member includes a second connecting portion connecting upper parts of the first and second walls with each other.

The invention according to claim 3 is the seat device according to claim 2, comprising a plurality of the first connecting portions, wherein the second connecting portion is arranged between the plurality of the first connecting portions.

The invention according to claim 4 is the seat device according to any one of claims 1 to 3, wherein front and rear ends of the reinforcing member respectively include front and rear wide portions, each having a lager vertical width in comparison to a central portion of the reinforcing member.

The invention according to claim 5 is the seat device according to claim 4, wherein the first connecting portion is disposed nearer to a center of the reinforcing member than the front and rear wide portions of the reinforcing member.

The invention according to claim 6 is the seat device according to any one of claims 1 to 5, wherein ribs extending inward are respectively provided at upper edges of the first and second walls and ribs extending inward are respectively provided at lower edges of the first and second walls.

The invention according to claim 7 is the seat device according to claim 6, the ribs respectively provided at the lower edges of the first and second walls continue to the first connecting portion.

The invention according to claim 8 is the seat device according to any one of claims 1 to 7, wherein the reinforcing member is disposed so as to be spaced from a fixed portion where the front support leg is fixed onto the one of the left and right slide units and from a fixed portion where the rear support leg is fixed onto the one of the left and right slide units.

The invention according to claim 9 is the seat device according to claim 8, wherein the reinforcing member includes an opening at a portion facing the fixed portion.

The invention according to claim 10 is the seat device according to any one of claims 1 to 9, wherein the reinforcing member is provided with a component attachment portion for attaching other component.

The invention according to claim 11 is the seat device according to claim 10, wherein the other component is a cover which covers the reinforcing member and portions of the reinforcing member respectively fixed onto the front and rear supporting legs.

The invention according to claim 12 is the seat device according to claim 10 or 11, wherein the reinforcing member is provided with a plurality of the component attaching portions; and the reinforcing member is provided with a bead extending in the front-rear direction which faces the plurality of the component attaching portions.

The invention according to claim 13 is the seat device according to claim 12, wherein front and rear ends of the reinforcing member respectively include front and rear wide portions, each having a lager vertical width in comparison to a central portion of the reinforcing member; and the bead extends into the front and rear wide portions.

The invention according to claim 14 is the seat device according to claim 12 or 13, wherein the bead is provided at a portion corresponding to the first connecting portion.

The invention according to claim 15 is the seat device according to any one of claims 1 to 14, wherein a drive unit is disposed in a space between the one of the left and right slide units and the reinforcing member.

The invention according to claim 16 is the seat device according to any one of claims 1 to 15, wherein the first and second walls have the same shape.

The invention according to claim 17 is the seat device according to any one of claims 1 to 16, wherein the reinforcing member is provided only between the front and rear support legs fixed to the one of the left and right slide units; the rear support leg fixed to the other of the left and right slide units includes: a base portion which overlaps with the other of the left and right slide units and which is fixed to the other of the left and right slide units; an extension fixing portion which extends downward from the base portion and which is fixed onto an extension floor which extends downward from a horizontal surface; and a regulating portion fixed to the other of the left and right slide units so as to press a front surface of the extension fixing portion.

The invention according to claim 18 is the seat device according to claim 17, wherein the regulating portion includes an upper surface which overlaps with the other of the left and right slide units; the upper surface includes a recess, the recess and the front surface of the extension fixing portion facing each other and being joined to each other by welding.

The invention according to claim 19 is the seat device according to claim 18, wherein the regulating portion includes: a wall portion extending downward from the upper surface; and an extension portion extending outward from a lower end of the wall portion.

The invention according to claim 20 is the seat device according to claim 19, wherein the regulating portion includes: a downward extending portion which extends downward and continuously from the extension portion to be welded onto the front surface of the extension fixing portion so as to be opposing to the front surface of the extension fixing portion.

Effects of Invention

According to the invention of claim 1, the first and second walls facing each other of the reinforcing member are provided with the first connecting portion which connects the lower parts of the first and second walls, and thus, the strength of the first and second walls is enhanced owing to the first connecting portion. Thereby, the condition of the connection between the front and rear support legs is improved and the strength of the front and rear support legs can be enhanced.

According to the invention of claim 2, the second connecting portion connecting the upper parts of the first and second walls with each other is provided, and thus, the strength of the first and second walls can be further enhanced owing to the second connecting portion.

According to the invention of claim 3, the second connecting portion is arranged between the multiple first connecting portions, and thus, the rigidity of the reinforcing member can be enhanced owing to the second connecting member.

According to the invention of claim 4, the front and rear ends of the reinforcing member are formed as the wide portions each having wider vertical length than that of the central portion of the reinforcing member, and thus, it is possible to increase areas for joining the reinforcing member to the front and rear support legs, and to enhance the rigidity of the attachment of the reinforcing member and the front and rear support legs.

According to the invention of claim 5, the first connecting portion is arranged nearer to the center of the reinforcing member than the front and rear wide portions, and thus, the portion having strength smaller than that of the wide portions is reinforced by the first connecting portion and the entire rigidity of the reinforcing member can be enhanced.

According to the invention of claim 6, the upper edges of the first and second walls are respectively provided with the ribs extending inward and the lower edges of the first and second walls are respectively provided with the ribs extending inward, and thus, the rigidity of the reinforcing member is enhanced owing to the ribs.

According to the invention of claim 7, the ribs respectively provided at the lower edges of the first and second walls continue to the first connecting portion, and thus, the ribs and the first connecting portion are integrated to further enhance the rigidity of the reinforcing member.

According to the invention of claim 8, the reinforcing member is arranged so as to have spacing from the fixed portion where the front support leg is fixed onto the slide unit and from the fixed portion where the rear support leg is fixed onto the slide unit, and thus, each of the front and rear support legs can be connected to the slide unit taking advantage of the spacing. Thus, each of the front and rear support legs can be easily connected to the slide unit in comparison to a case without such spacing.

According to the invention of claim 9, the reinforcing member includes the opening at the portion facing the fixing portion, and thus, it is possible to easily engage a tool with the fixing portion through the opening and to enhance convenience in assembling process.

According to the invention of claim 10, the component attachment portion for attaching another component is mounted onto the reinforcing member, and thus, the reinforcing member and the component attachment portion are integrated to enhance the strength of the reinforcing member and to improve the rigidity of the attached portion of the other component.

According to the invention of claim 11, the other component is a cover which covers the reinforcing member and the portion of the reinforcing member fixed onto the front and rear supporting legs, and thus, these parts are covered by the cover and appearance is improved.

According to the invention of claim 12, the reinforcing member is provided with the bead extending in the front-rear direction which faces the multiple component attachment portions, and thus, the bead can enhance the strength in vicinity of the component attachment portions and can further enhance the stability of the component attachment portions.

According to the invention of claim 13, the bead extends into the wide portions, and thus, the bead also enhances the strength of the wide portions.

According to the invention of claim 14, the bead is provided at the position corresponding to the first connecting portion, and thus, the bead can enhance the rigidity of the reinforcing member.

According to the invention of claim 15, the drive unit is disposed in a space between the slide unit and the reinforcing member, and thus, the drive unit can be disposed in a dead space and the increase in size of the seat device can be suppressed.

According to the invention of claim 16, the first and second walls have the same shape, and thus, it is possible to use common parts for the first and second walls.

According to the invention of claim 17, the rear support leg, which does not include the reinforcing member, of the other of the slide units is provided with the regulating portion which is to be fixed onto the other of the slide units and which presses the front surface of the extension fixing portion, and thus, strength of the rear support leg which supports the other of the slide units can be enhanced.

According to the invention of claim 18, at least a part of the welded portion is accommodated in the recess provided in the upper surface of the regulating portion, and thus, it is possible to suppress the increase in size of the support leg and to integrate the regulating portion and the extension fixing portion.

According to the invention of claim 19, the regulating portion includes the walls extending downward from the upper surface and the extension portion extending outward from the lower end of the wall, and thus, the rigidity of the regulating portion can be enhanced by this construction.

According to the invention of claim 20, The downward extending portion of the regulating portion and the front surface of the extension fixing portion are welded with each other, and thus, the regulating portion and the extension fixing portion are integrated in a relatively large area and the rigidity in the attached portion of the regulating portion and the extension fixing portion can be enhanced.

DESCRIPTION OF EMBODIMENTS

Embodiments of the present invention will now be described with reference to the accompanying drawings. Although the following embodiments include various limitations that are technically preferred in the practice of the present invention, the scope of the present invention should not be limited to the embodiments or illustrated examples.

Figure 1:
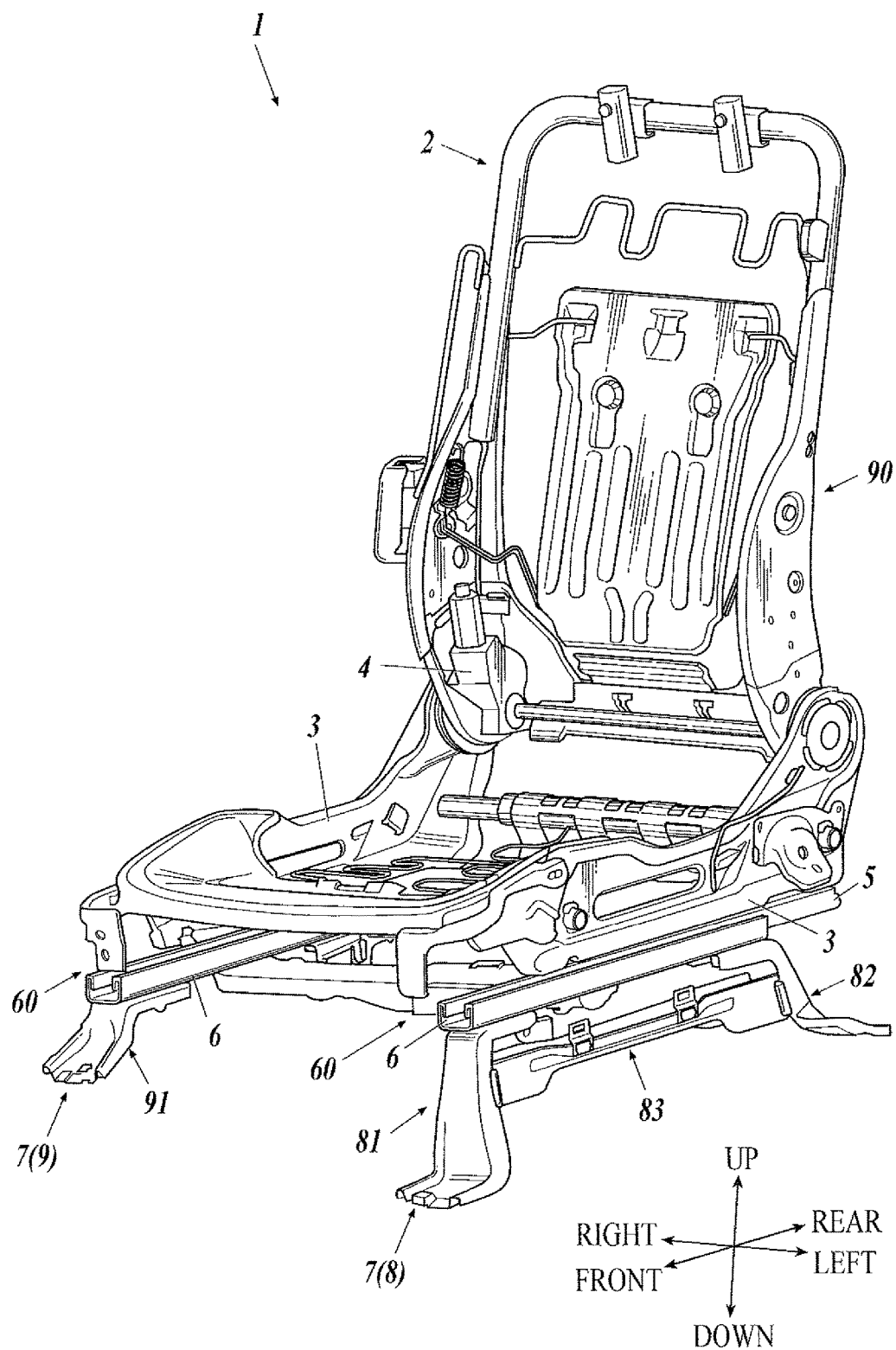
FIG. 1 is a perspective view showing essential components of a seat device according to the present embodiment.

FIG. 1 is a perspective view showing essential components of a seat device according to the present embodiment. As shown in FIG. 1, the seat device 1 includes a seat body 90, left and right slide units 60 which support the seat body 90 slidably along a front-rear direction, and legs 7 which fix the left and right slide units 60 relative to a vehicle floor.

The seat body 90 includes a seat back frame 2, left and right cushion side frames 3 respectively disposed on left and right sides of a lower portion of the seat back frame 2, and a reclining mechanism 4 for tilting the seat back frame 2 with respect to the cushion side frames 3.

The slide units 60 include left and right upper rails 5 which respectively support the left and right cushion side frames 3, and left and right lower rails 6 which slidably support the left and right upper rails 5, respectively. The legs 7 are attached to the lower rails 6.

The legs 7 include a left leg 8 for supporting the left slide unit 60 and a right leg 9 for supporting the right slide unit 60. A vehicle floor may have a step along a left-right direction. In the present embodiment, the description will be given, as an example, for a case where the left leg 8 is installed onto a lower floor surface in comparison to a floor surface onto which the right leg 9 is installed.

Figure 2:
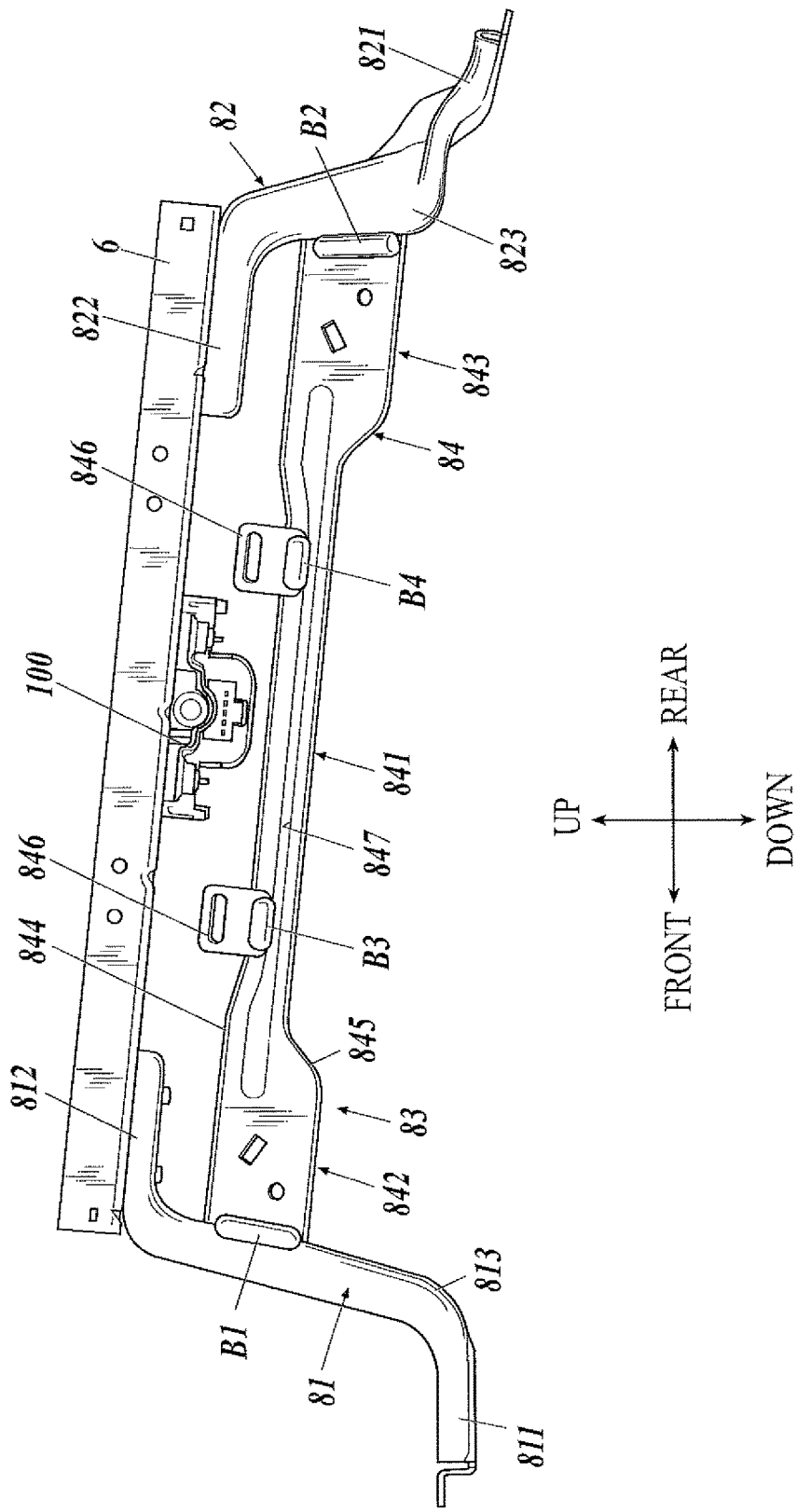
FIG. 2 is a side view schematically showing a construction of a left leg according to the present embodiment.

The left leg 8 will be described in detail. FIG. 2 is a side view schematically showing a construction of the left leg 8.

Figure 3:
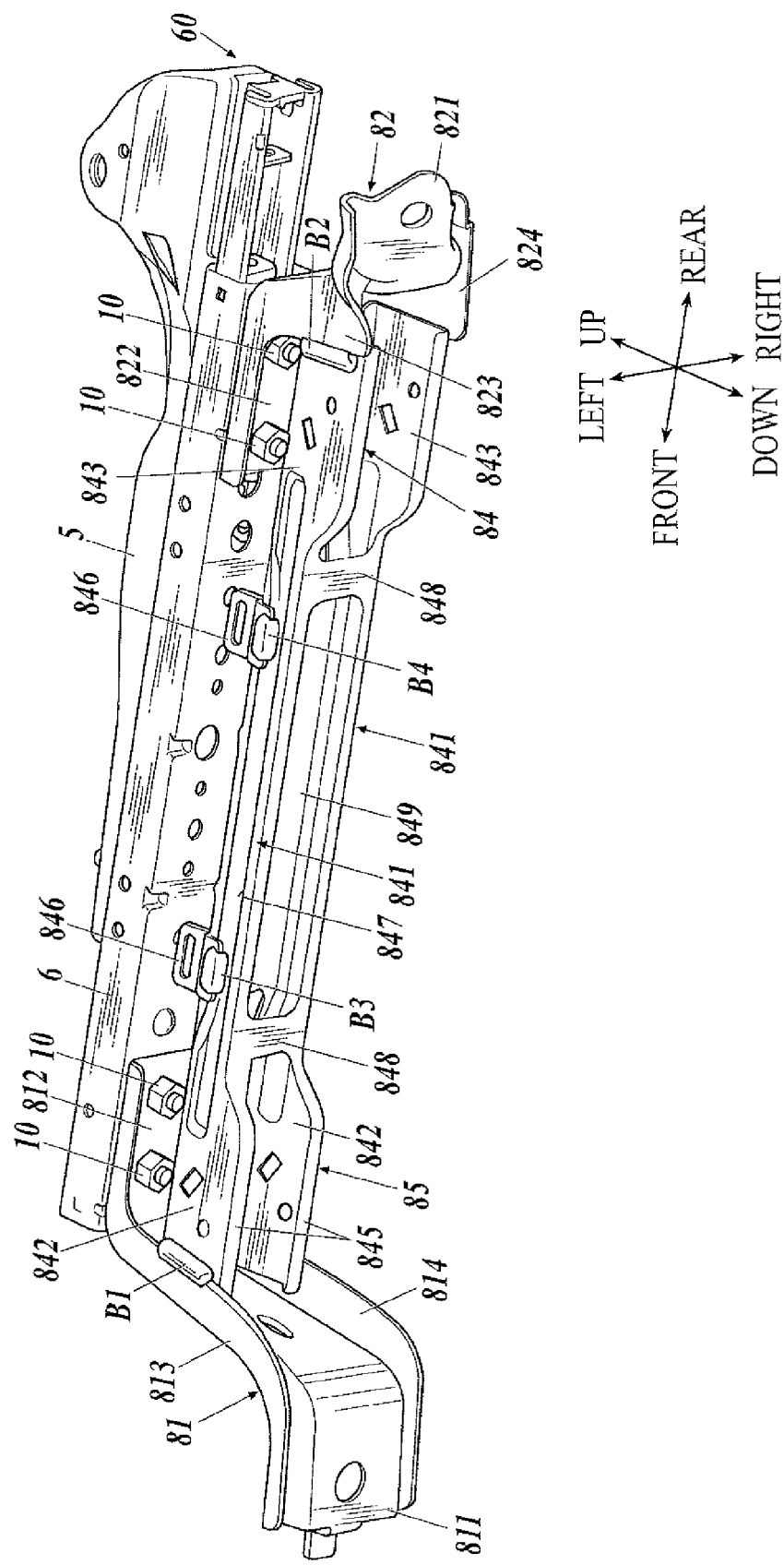
FIG. 3 is a perspective view schematically showing the left leg in FIG. 2.
Figure 4:
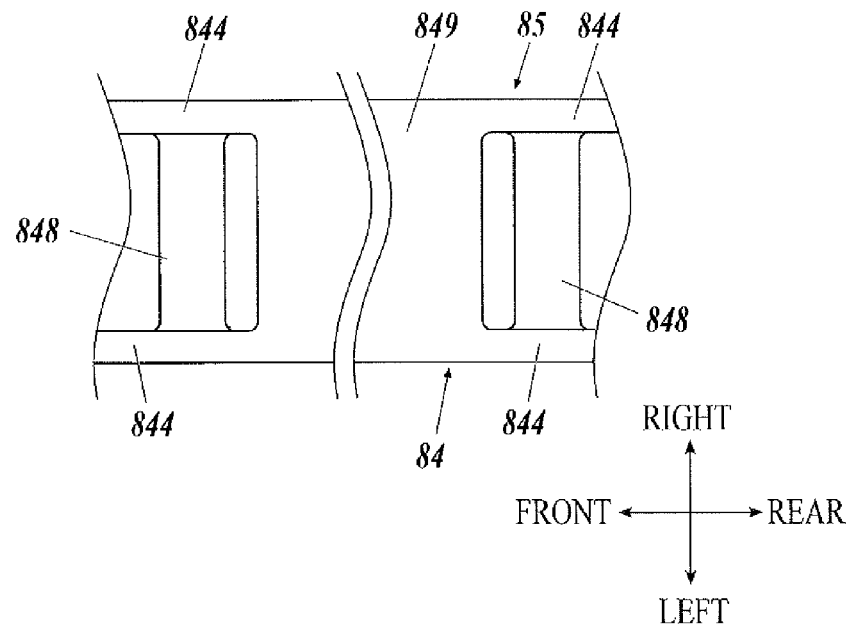
FIG. 4 is a top view showing a part of the left leg in FIG. 2.
Figure 5:
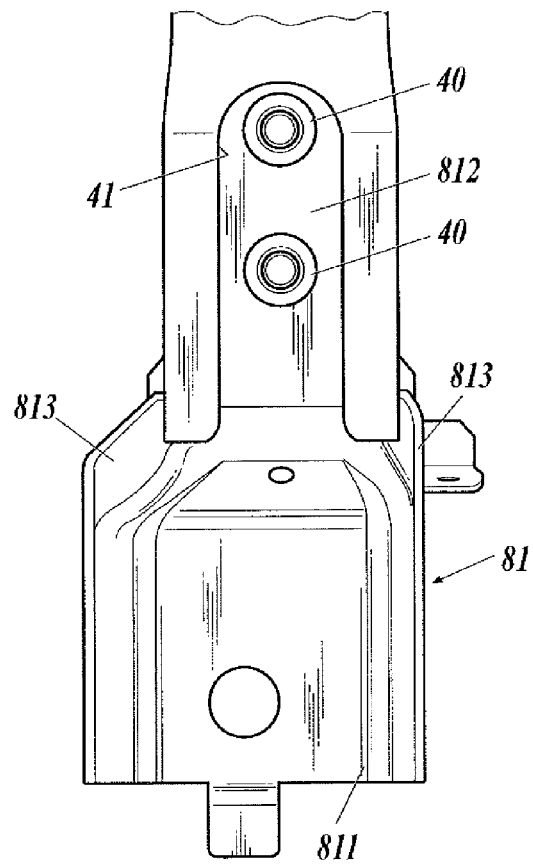
FIG. 5 is a bottom view showing a part of the left leg in FIG. 2.

FIG. 3 is a perspective view schematically showing the construction of the left leg 8. FIG. 4 is a top view showing a part of the left leg 8. FIG. 5 is a bottom view showing a part of the left leg shown in FIG. 2.

As shown in FIGS. 2 to 5, the left leg 8 includes a front support leg 81 fixed to a front end of the lower rail 6, a rear support leg 82 fixed to a rear end of the lower rail 6, and a reinforcing member 83 extending between the front and rear support legs 81 and 82.

The front support leg 81 includes at a lower end thereof a floor fixing portion 811 which extends forward to be fixed onto the vehicle floor. The front support leg 81 includes at an upper end thereof a rail fixing portion 812 which extends rearward to overlap with a lower surface of a front end of the lower rail 6 and to be fixed onto the lower rail 6. Left and right sides of the front support leg 81 are respectively provided with ribs 813 and 814 each erected toward the floor surface and continuously extending from the floor fixing portion 811 to the rail fixing portion 812.

The rear support leg 82 includes at a lower end thereof a floor fixing portion 821 which extends rearward to be fixed onto the vehicle floor. The rear support leg 82 includes at an upper end thereof a rail fixing portion 822 which extends forward to overlap with a lower surface of a rear end of the lower rail 6 and to be fixed onto the lower rail 6. Left and right sides of the rear support leg 82 are respectively provided with ribs 823 and 824 each erected toward the floor surface and continuously extending from the floor fixing portion 821 to the rail fixing portion 822.

The rail fixing portion 812 of the front support leg 81 is fixed onto the lower rail 6 by means of a fixture 40 such as a screw (refer to FIG. 5). The rail fixing portion 822 of the rear support leg 82 is similarly fixed onto the lower rail 6 (not shown).

The reinforcing member 83 is disposed so as to be spaced in the vertical direction from the ribs 813 and 814 located at the floor fixing portion 811 of the front support leg 81 and from the ribs 823 and 824 located at the floor fixing portion 821 of the rear support leg 82. The reinforcing member 83 includes a first wall 84 and a second wall 85. The first wall 84 is attached to the left side of each of the front support leg 81 and the rear support leg 82. The second wall 85 is attached to the right side of each of the front support leg 81 and the rear support leg 82, and faces the first wall 84.

A front end of the first wall 84 is disposed on an inner side (right side) of the left rib 813 of the front support leg 81, and is fixed to an outer side of the left rib 813 by welding. A rear end of the first wall 84 is disposed on an inner side of the left rib 823 of the rear support leg 82, and is fixed to an outer side of the left rib 823 by welding. In FIGS. 2 and 3, reference numerals B1 and B2 denote the welded portions.

A front end of the second wall 85 is disposed on an inner side (left side) of the right rib 814 of the front support leg 81, and is fixed to an outer side of the right rib 814 by welding. A rear end of the second wall 85 is disposed on an inner side of the right rib 824 of the rear support leg 82, and is fixed to an outer side of the right rib 824 by welding.

Thus, since the first and second walls 84 and 85 are disposed on the inner sides of the left and right ribs 813 and 814 of the front support leg 81 and on the inner sides of the left and right ribs 823 and 824 of the rear support leg 82, respectively, the reinforcing member 83 can be disposed in a compact manner.

Since the first wall 84 and the second wall 85 have substantially the same shape, the first wall 84 will be described in the following and the structures of the second wall 85 corresponding to the equivalent structures of the first wall 84 will be denoted by the same reference numerals to omit the description of the second wall 85.

The first wall 84 includes a central portion 841, a front wide portion 842 and a rear wide portion 843. The front wide portion 842 continues forward from the central portion 841 and has a vertical width larger than that of the central portion 841. The rear wide portion 843 continues rearward from the central portion 841 and has a vertical width larger than that of the central portion 841. The front wide portion 842 extends to the central portion 841, and thus, the front wide portion 842 is located closer to the central portion 841 in comparison to the rail fixing portion 812 of the front support leg 81. The rear wide portion 843 extends to the central portion 841, and thus, the rear wide portion 843 is located closer to the central portion 841 in comparison to the rail fixing portion 822 of the rear support leg 82.

A rib 844 extending inward is formed so as to continue from a front end to a rear end of an upper edge of the first wall 84. A rib 845 extending inward is formed so as to continue from a front end to a rear end of a lower edge of the first wall 84.

A ribs 844 and 845 each extending inward are also formed at upper and lower edges of the second wall 85, respectively, and thus, the ribs 844 and 845 of the first wall 84 and the ribs 844 and 845 of the second wall 85 face each other to enhance the entire rigidity of the reinforcing member 83.

The upper edge of the central portion 841 is lower than the upper edges of the front and rear wide portions 842 and 843. The lower edge of the central portion 841 is higher than lower edges of the front and rear wide portions 842 and 843. Boundaries between the central portion 841 and the front and rear wide portions 842 and 843 are tapered.

Two component attachment portions 846 are attached, by means of welding, to an outer surface of the upper edge of the central portion 841 at a predetermined interval in the front-rear direction in order to attach another component(s). The welded portions of the component attachment portions 846 are denoted by reference numeral B3 and B4 in FIGS. 2 and 3. The component attachment portions 846 are disposed so as not to face the rail fixing portion 812 of the front support leg 81 and the rail fixing portion 822 of the rear support leg 82, and thus, the interference of the front and rear support legs 81 and 82 with the component attachment portions 846 and the other component(s) attached to the component attachment portions 846 can be suppressed.

The other component (s) described above may be a cover 45 to be attached to the left leg 8, for example.

Figure 6:
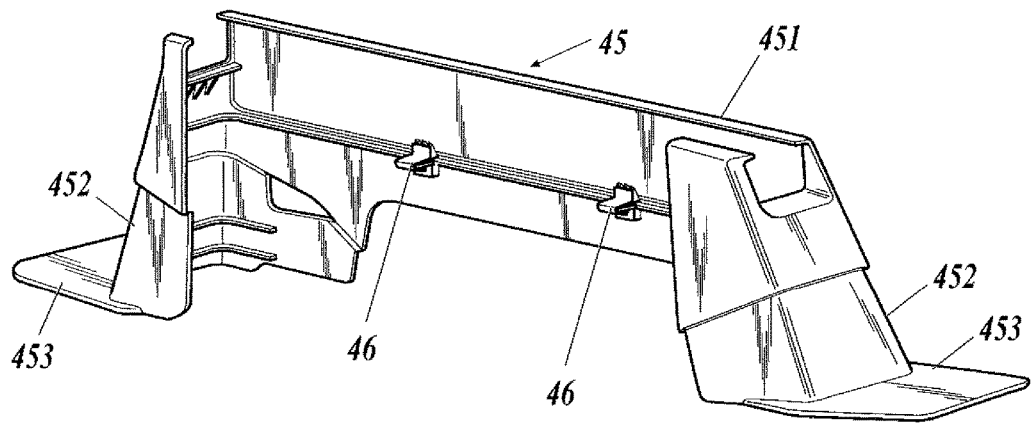
FIG. 6 is a perspective view schematically showing a construction of a cover according to the present embodiment.
Figure 7:
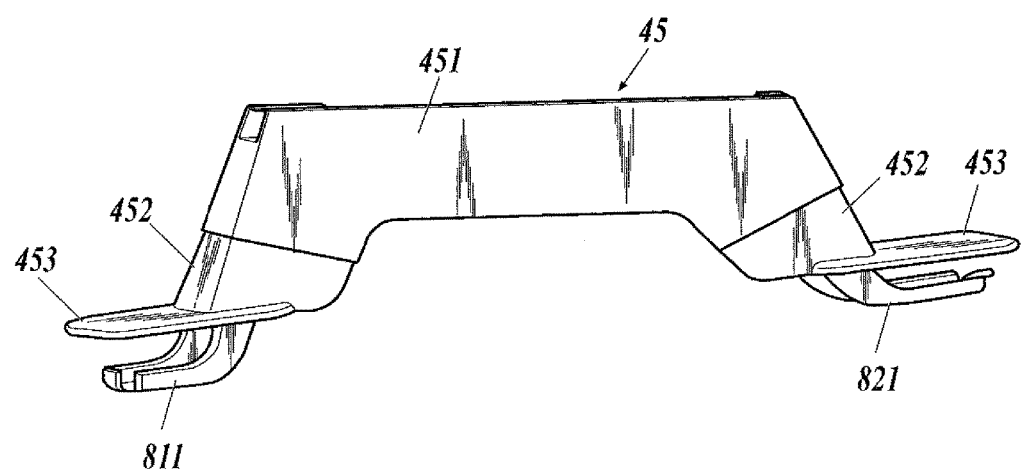
FIG. 7 is a perspective view schematically showing the cover attached to the left leg.

FIG. 6 is a perspective view schematically showing a construction of the cover 45. FIG. 7 is a perspective view schematically showing the cover 45 attached to the left leg 8.

As shown in FIG. 6, the cover 45 includes a first cover 451, front and rear second covers 452 and front and rear third covers 453. The first cover 451 extends in the front-rear direction to cover the reinforcing member 83 and an upper part of each of the front and rear support legs 81 and 82. The front second cover 452 extends downward from a front end of the first cover 451 to cover a lower part of the front support leg 81. The rear second cover 452 extends downward from a rear end of the first cover 451 to cover a lower part of the rear support leg 82. The front third cover 453 extends forward from a lower end of the front second cover 452 to cover the floor fixing portion 811. The rear third cover 453 extends rearward from a lower end of the rear second cover 452 to cover the floor fixing portion 821. The first cover 451, the second covers 452 and the third covers 453 are separate from one another, and are assembled to form the cover 45.

The first cover 451 includes on an inner side thereof engaging pieces 46 which respectively engage the front and rear component attachment portions 846. The engagement of the engaging pieces 46 with the component attachment portions 846 causes the cover 45, as shown in FIG. 7, to cover the reinforcing member 83, the portion of the reinforcing member 83 fixed onto the front and rear supporting legs 81 and 82, and the lower rail 6.

While, in the cover 45 shown in FIGS. 6 and 7, the third covers 453 cover above the floor fixing portions 811 and 812, the third covers 453 may cover the entire circumference of the floor fixing portions 811 and 821, whereby the entirety of the front and rear support legs 81 and 82 are covered by the cover 45.

As shown in FIGS. 2 and 3, for example, a drive unit 100 such as a motor is arranged between the multiple component attachment portions 846 in a space between the lower rail 6 and the reinforcing member 83.

The first wall 84 is provided with a bead 847 extending in the front-rear direction and facing the multiple component attachment portions 846. The bead 847 extends such that front and rear ends thereof are respectively located forward and rearward of the multiple component attachment portions 846. The front and rear ends of the bead 847 extend into the front and rear wide portions 842 and 843, respectively. Thus, the front end of the bead 847 is located so as to face the rail fixing portion 812 of the front support leg 81, and the rear end of the bead 847 is located so as to face the rail fixing portion 822 of the rear support leg 82.

The first and second walls 84 and 85 are provided with a pair of first connecting portions 848 which connect lower ends of the first and second walls 84 and 85 and a second connecting portion 849 which connects upper ends of the first and second walls 84 and 85.

The pair of the first connecting portions 848 are provided so as to transversely extend between respective lower ends of the central portions 841 and 841 of the first and second walls 84 and 85. The pair of the first connecting portions 848 are arranged on outer sides of the multiple component attachment portions 846 and in vicinity of the outermost component attachment portions 846. It is possible to distribute force exerted to each of the component attachment portions 846 to the pair of the first connecting portions 848, and thus, to enhance the strength of the component attachment portions 846.

The second connecting portion 849 is provided so as to transversely extend between respective upper ends of the central portions 841 and 841 of the first and second walls 84 and 85. The second connecting portion 849 is arranged between the pair of the first connecting portions 848.

The reinforcing member 83 includes openings 41 for exposing the fixture 40 used at the rail fixing portion 812 through the reinforcing member 83 from below (refer to FIG. 5). Namely, the reinforcing member 83 has an opening at a portion facing the rail fixing portion.

Figure 8:
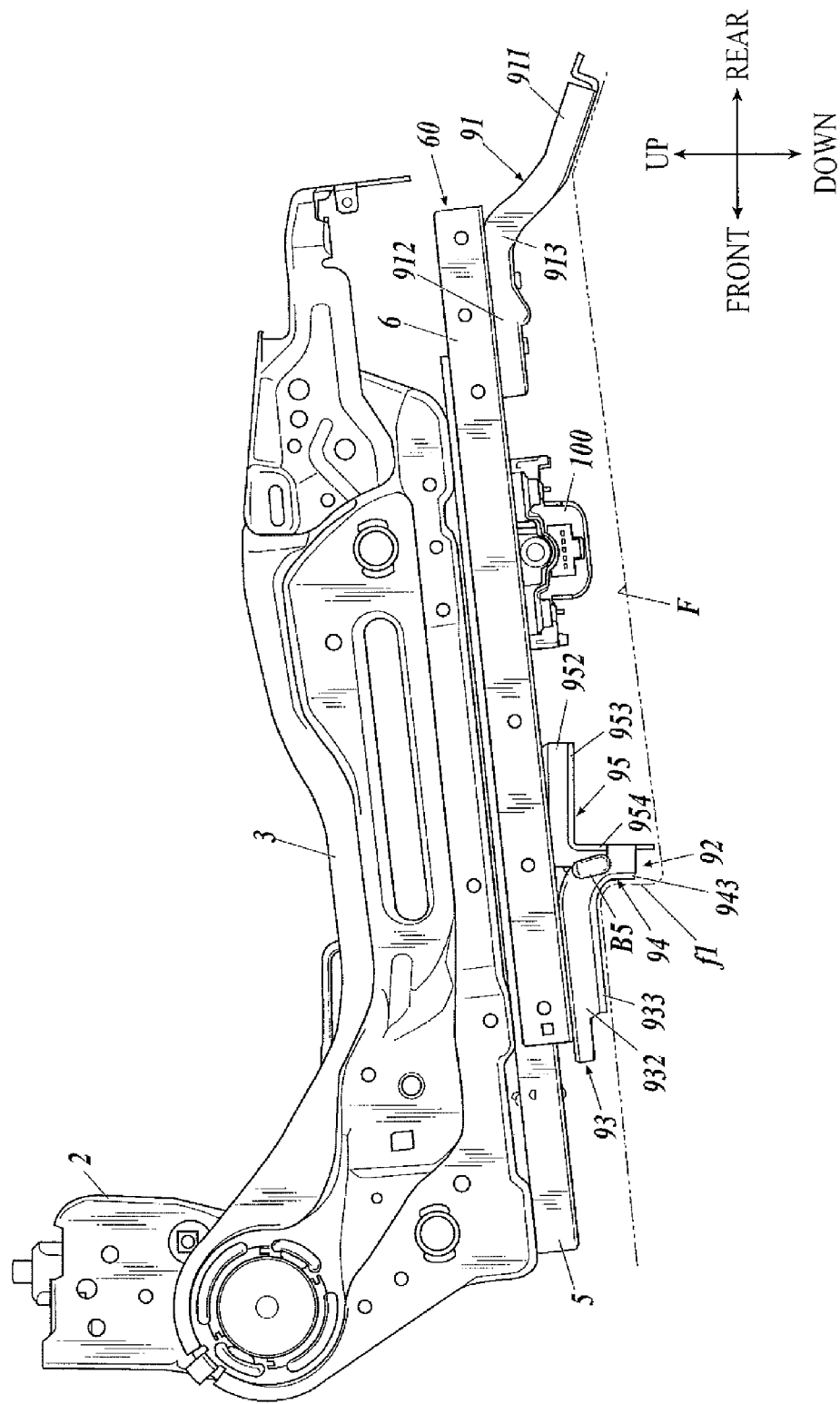
FIG. 8 is a side view schematically showing a construction of a right leg according to the present embodiment.

Now, the right leg 9 will be described in detail. FIG. 8 is a side view schematically showing a construction of the right leg 9.

The right leg 9 includes a front support leg 91 fixed onto the front end of the lower rail 6 and a rear support leg 92 fixed onto the rear end of the lower rail 6. The drive unit 100 is arranged between the front and rear support legs 91 and 92 in a space defined by a floor F and the lower rail 6.

The front support leg 91 includes at a lower end thereof a floor fixing portion 911 which extends forward to be fixed onto the floor F of the vehicle. The front support leg 91 includes at an upper end thereof a rail fixing portion 912 which extends rearward to overlap with the lower surface of the front end of the lower rail 6 and to be fixed onto the lower rail 6. Left and right sides of the front support leg 91 are respectively provided with ribs 913 each erected toward the floor surface extending continuously from the floor fixing portion 911 to the rail fixing portion 912.

Figure 9:
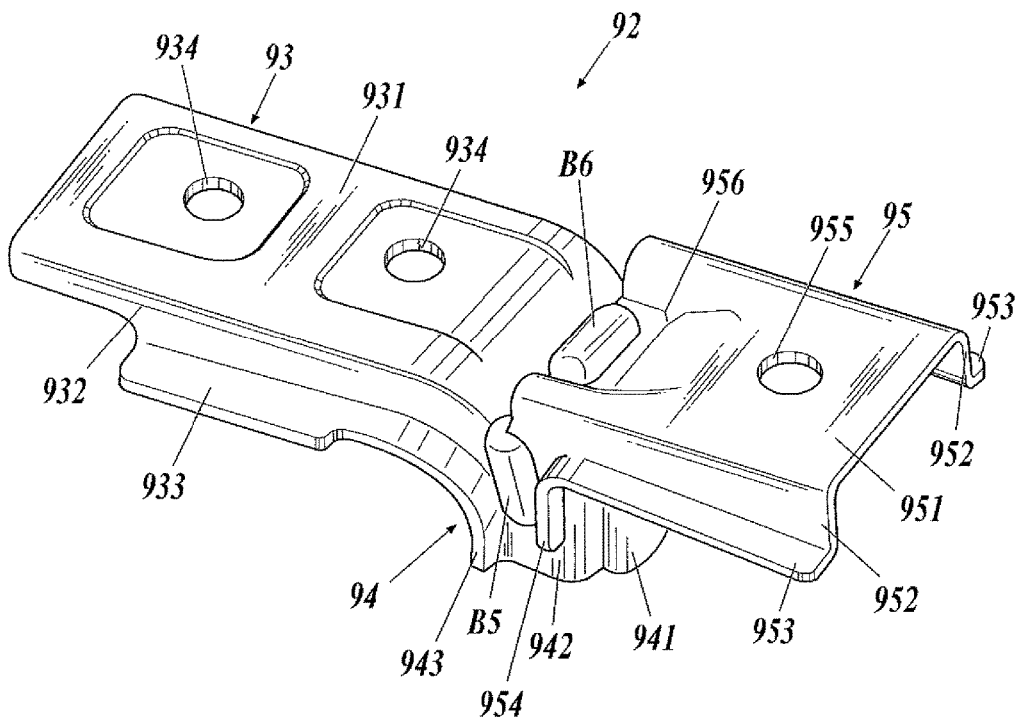
FIG. 9 is a perspective view seen from obliquely upward of a rear support leg according to the present embodiment.
Figure 10:
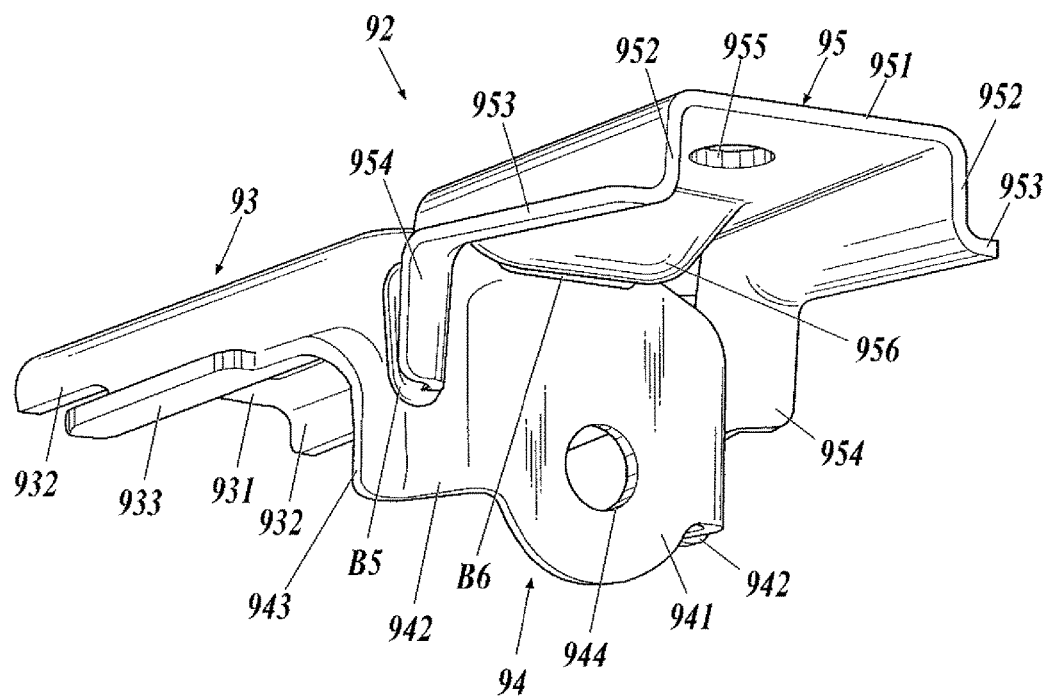
FIG. 10 is a perspective view seen from obliquely downward of the rear support leg in FIG. 9.

FIG. 9 is a perspective view seen from obliquely upward of the rear support leg 92. FIG. 10 is a perspective view seen from obliquely downward of the rear support leg 92.

As shown in FIGS. 9 and 10, the rear support leg 92 includes a base portion 93, an extension fixing portion 94 and a regulating portion 95. The base portion 93 overlaps with the right lower rail 6 to be fixed to the right lower rail 6. The extension fixing portion 94 extends downward from the base portion 93 so as to face an extension floor f1, which is substantially perpendicular to the horizontal surface, and is fixed onto the extension floor f1. The regulating portion 95 is fixed onto the lower rail 6 so as to press a front surface 941 of the extension fixing portion 94.

The extension floor f1 may extend downward from the horizontal surface at an angle other than a substantial right angle. In this case, it is preferable that the extension fixing portion 94 extends so as to correspond to the incline of the extension floor f1.

The base portion 93 includes an upper surface 931, a pair of wall portions 932 and an extension portion(s) 933. The upper surface 931 overlaps with the lower surface of the lower rail 6. The pair of the wall portions 932 respectively extend downward from left and right sides of the upper surface 931. The extension portion(s) extends outward from a lower end(s) of the wall portion(s) 932 to overlap with the floor F. Two through holes 934 are provided in the upper surface 931 at a predetermined interval along the front-rear direction. Fixtures such as screws are inserted through the through holes 934 to engage with the lower rail 6 whereby the base portion 93 can be fixed onto the lower rail 6.

The extension fixing portion 94 includes the front surface 941, wall portions 942 and an extension portion (s) 943. The front surface extends downward and continuously from the upper surface 931 to face the extension floor f1. The wall portions 942 respectively extend rearward and continuously from the wall portions 932 of the base portion 93. The extension portion(s) 943 extends outward from a rear end(s) of the wall portion(s) 942 so as to continue to the extension portion 933 of the base portion 93 and to overlap with the extension floor f1.

A through hole 944 is formed in the front surface 941. A fixture such as a screw is inserted into the through hole 944 and engages with the extension floor f1, whereby the base portion 93 and the extension fixing portion 94 can be fixed onto the floor F.

The regulating portion 95 includes an upper surface 951, a pair of wall portions 952, extension portions 953 and downward extending portions 954. The upper surface 951 overlaps with the lower surface of the lower rail 6. The pair of the wall portions 952 respectively extend downward from left and right sides of the upper surface 951. The extension portions 953 outward extend from lower ends of the wall portions 952, respectively. The downward extending portions 954 extend downward and continuously from rear ends of the extension portion 953, respectively, and are welded onto the opposing extension portions 943 of the extension fixing portion 94. The welded portion of the downward extending portion 954 and the extension portion 943 is denoted by reference numeral B5 in FIGS. 9 and 10.

A through hole 955 is provided in the upper surface 951. A fixture such as a screw is inserted into the through hole 955 and engages with the lower rail 6, whereby the regulating portion 95 can be fixed onto the lower rail 6. The rear end of the upper surface 951 has a recess 956 which is formed on the recess 956 and which is gradually lowered rearward. A rear end of the recess 956 faces the front surface 941 of the extension fixing portion 94, and the recess 956 and the front surface 941 are fixed with each other by welding. This welded portion is shown by reference numeral B6 in FIGS. 9 and 10.

As described above, according to the present embodiment, the opposing first and second walls 84 and 85 of the reinforcing member 83 are provided with the first connecting portion 848 which connect the lower ends of the first and second walls 84 and 85, and thus, the strength of the first and second walls 84 and 85 is enhanced owing to the first connecting portion 848. The condition of the connection between the front and rear support legs 81 and 82 is improved and it is possible to enhance the strength of the front and rear support legs 81 and 82.

The first and second walls 84 and 85 are provided with the second connecting portion 849 which connects the upper ends of the first and second walls 84 and 85, and thus, the strength of the first and second walls 84 and 85 can be further enhanced owing to the second connecting portion 849.

The second connecting portion 849 is arranged between the multiple first connecting portions 848, and thus, the rigidity of the reinforcing member 83 can be enhanced owing to the second connecting member 849.

The front and rear ends of the reinforcing member 83 are formed as the wide portions (the front and rear wide portions 842 and 843) each having wider vertical length than that of the central portion 841, and thus, it is possible to increase areas for joining the reinforcing member 83 to the front and rear support legs 81 and 82, and to enhance the rigidity of the attachment of the reinforcing member 83 and the front and rear support legs 81 and 82.

The first connecting portion 848 is arranged nearer to the center of the reinforcing member 83 than the front and rear wide portions 842 and 843, and thus, the central portion 841, which has strength smaller than that of the front and rear wide portions 842 and 843, is reinforced by the first connecting portion 848 and the entire rigidity of the reinforcing member 83 can be enhanced.

The upper edges of the first and second walls 84 and 85 are respectively provided with the ribs 844 extending inward and the lower edges of the first and second walls 84 and 85 are respectively provided with the ribs 845 extending inward, and thus, the rigidity of the reinforcing member 83 is enhanced owing to the ribs 844 and 845.

The ribs 845 respectively provided at the lower edges of the first and second walls 84 and 85 continue to the first connecting portion 848, and thus, the ribs 845 and the first connecting portion 848 are integrated to further enhance the rigidity of the reinforcing member 83.

The reinforcing member 83 is arranged so as to have spacing from the fixed portion where the front support leg 81 is fixed onto the lower rail 6 (rail fixing portion 812) and from the fixed portion where the rear support leg 82 is fixed onto the lower rail 6 (rail fixing portion 822), and thus, each of the front and rear support legs 81 and 82 can be assembled with the lower rail 6 taking advantage of the spacing. As shown in FIG. 3, the rail fixing portions 812 and 822 are assembled with the lower rail 6 by fastening nuts 10 from the lower sides of the rail fixing portions 812 and 822, and, owing to the above described spacing, it is possible to easily engage a tool with the nuts 10. Thus, it is possible to easily assemble each of the front and rear support legs 81 and 82 with the lower rail 6 in comparison to a case without such spacing.

The reinforcing member 83 includes the opening at the portion facing the fixing portion, and thus, it is possible to easily engage a tool with the fixing portion through the opening 41 and to enhance convenience in assembling work.

The component attachment portion 846 is mounted onto the reinforcing member 83 by welding, and thus, the reinforcing member 83 and the component attachment portion 846 are integrated to enhance the strength of the reinforcing member 83 and to improve the rigidity of the attached portion of the other component.

The other component may be a cover 45 which covers the reinforcing member 83 and the portion of the reinforcing member 83 fixed onto the front and rear supporting legs 81 and 82, and thus, these parts are covered by the cover 45 and appearance is improved.

The reinforcing member 83 is provided with the bead 847 extending in the front-rear direction and facing the multiple component attachment portions 846, and thus, the bead 847 can enhance the strength in vicinity of the component attachment portions 846. While load is concentrated to the component attachment portions 846 through the other component(s), the stability of the component attachment portions 846 can be enhanced if the bead 847 enhances the strength in vicinity of the component attachment portions 846 as described above.

The bead 847 extends such that front and rear ends thereof are respectively located forward and rearward of the multiple component attachment portions 846, and thus, the strength of not only in vicinity of the component attachment portions 846 but also in the other regions is enhanced. Therefore, the stability of the component attachment portions 846 can be further enhanced.

The bead 847 is provided at a position corresponding to the first connecting portion 848, and thus, the bead 847 can enhance the rigidity of the reinforcing member 83.

The drive unit 100 is disposed in a space between the slide unit 60 and the reinforcing member 83, and thus, the drive unit 100 can be disposed in a dead space and the increase in size of the seat device 1 can be suppressed.

The rear support leg 92, which does not include the reinforcing member 83, of the right lower rail 6 is provided with the regulating portion 95 which is to be fixed onto the lower rail 6 and which presses the front surface 941 of the extension fixing portion 94, and thus, strength of the rear support leg 92 for supporting the lower rail 6 can be enhanced.

At least a part of the welded portion is accommodated in the recess 956 provided in the upper surface 931 of the regulating portion 95, and thus, it is possible to suppress the increase in size of the rear support leg 92 and to integrate the regulating portion 95 and the extension fixing portion 94.

The regulating portion 95 includes the wall portions 932 extending downward from the upper surface 931 and the extension portions 933 extending outward from the lower end of the wall portions 932, and thus, the rigidity of the regulating portion 95 can be enhanced by this construction.

The downward extending portion 954 of the regulating portion 95 and the front surface 941 of the extension fixing portion 94 are welded with each other, and thus, the regulating portion 95 and the extension fixing portion 94 are integrated in a relatively large area and the rigidity in the attached portion of the regulating portion 95 and the extension fixing portion 94 can be enhanced.

The embodiment of the present invention is not limited to the above embodiment and various modifications can be made without departing from the spirit of the present invention.

For example, in the above embodiment, the seat device 1 including the drive unit 100 is described as an example, but it is possible to apply the construction of the present invention to a seat device which does not need the drive unit 100. In such a case, it is sufficient to attach the legs 7 of the present embodiment to the seat device which does not need the drive unit 100.

It is preferable that the first and second walls 84 and 85 have the same shape, whereby it is possible to use common parts for the first and second walls 84 and 85.

INDUSTRIAL APPLICABILITY

The seat device according to the present invention is applicable to a seat device mounted in a vehicle, for example.

DESCRIPTION OF REFERENCE NUMERALS

1 seat device
2 seat back frame
3 cushion side frame
4 reclining mechanism
5 upper rail
6 lower rail
7 leg
8 left leg
9 right leg
41 opening
60 slide unit
81 front support leg
82 rear support leg
83 reinforcing member
84 first wall
85 second wall
90 seat body
91 front support leg
92 rear support leg
93 base portion
94 extension fixing portion
95 regulating portion
100 drive unit
812 rail fixing portion
822 rail fixing portion
841 central portion
842 front wide portion (wide portion)
843 rear wide portion (wide portion)
846 component attachment portion
847 bead
848 first connecting portion
849 second connecting portion
941 front surface
F floor
f1 extension floor

The invention claimed is:

1. A seat device, comprising:
   left and right slide units for supporting a seat body slidably in a front-rear direction;
   left and right front support legs respectively fixed to front ends of the left and right slide units;

left and right rear support legs respectively fixed to rear ends of the left and right slide units; and a reinforcing member extending between the front and rear support legs fixed to one of the left and right slide units, wherein the reinforcing member includes:

a first wall attached to one side of each of the front and rear support legs;

a second wall attached to the other side of each of the front and rear support legs, the second wall facing the first wall; and a first connecting portion connecting lower parts of the first and second walls with each other.

2. The seat device according to claim 1, wherein the reinforcing member includes a second connecting portion connecting upper parts of the first and second walls with each other.

3. The seat device according to claim 2, comprising a plurality of the first connecting portions, wherein the second connecting portion is arranged between the plurality of the first connecting portions.

4. The seat device according to claim 1, wherein front and rear ends of the reinforcing member respectively include front and rear wide portions, each having a lager vertical width in comparison to a central portion of the reinforcing member.

5. The seat device according to claim 4, wherein the first connecting portion is disposed nearer to a center of the reinforcing member than the front and rear wide portions of the reinforcing member.

6. The seat device according to claim 1, wherein ribs extending inward are respectively provided at upper edges of the first and second walls and ribs extending inward are respectively provided at lower edges of the first and second walls.

7. The seat device according to claim 6, the ribs respectively provided at the lower edges of the first and second walls continue to the first connecting portion.

8. The seat device according to claim 1, wherein the reinforcing member is disposed so as to be spaced from a fixed portion where the front support leg is fixed onto the one of the left and right slide units and from a fixed portion where the rear support leg is fixed onto the one of the left and right slide units.

9. The seat device according to claim 8, wherein the reinforcing member includes an opening at a portion facing the fixed portion.

10. The seat device according to claim 1, wherein the reinforcing member is provided with a component attachment portion for attaching other component.

11. The seat device according to claim 10, wherein the other component is a cover which covers the reinforcing member and portions of the reinforcing member respectively fixed onto the front and rear supporting legs.

12. The seat device according to claim 10, wherein the reinforcing member is provided with a plurality of the component attaching portions; and the reinforcing member is provided with a bead extending in the front-rear direction which faces the plurality of the component attaching portions.

13. The seat device according to claim 12, wherein front and rear ends of the reinforcing member respectively include front and rear wide portions, each having a lager vertical width in comparison to a central portion of the reinforcing member; and the bead extends into the front and rear wide portions.

14. The seat device according to claim 12, wherein the bead is provided at a portion corresponding to the first connecting portion.

15. The seat device according to claim 1, wherein a drive unit is disposed in a space between the one of the left and right slide units and the reinforcing member.

16. The seat device according to claim 1, wherein the first and second walls have the same shape.

17. The seat device according to claim 1, wherein the reinforcing member is provided only between the front and rear support legs fixed to the one of the left and right slide units;

the rear support leg fixed to the other of the left and right slide units includes:

a base portion which overlaps with the other of the left and right slide units and which is fixed to the other of the left and right slide units;

an extension fixing portion which extends downward from the base portion and which is fixed onto an extension floor which extends downward from a horizontal surface; and a regulating portion fixed to the other of the left and right slide units so as to press a front surface of the extension fixing portion.

18. The seat device according to claim 17, wherein the regulating portion includes an upper surface which overlaps with the other of the left and right slide units;

the upper surface includes a recess, the recess and the front surface of the extension fixing portion facing each other and being joined to each other by welding.

19. The seat device according to claim 18, wherein the regulating portion includes:

a wall portion extending downward from the upper surface; and an extension portion extending outward from a lower end of the wall portion.

20. The seat device according to claim 19, wherein the regulating portion includes:

a downward extending portion which extends downward and continuously from the extension portion to be welded onto the front surface of the extension fixing portion so as to be opposing to the front surface of the extension fixing portion.

* * * * *